United States Patent [19]
Kubota

[11] Patent Number: 5,450,368
[45] Date of Patent: Sep. 12, 1995

[54] TWO LIQUID TYPE MIXER

[75] Inventor: Yosimichi Kubota, Hachioji, Japan

[73] Assignee: Three Bond Co., Ltd., Tokyo, Japan

[21] Appl. No.: 174,545

[22] Filed: Dec. 28, 1993

[51] Int. Cl.$^6$ .............................................. B01F 5/06
[52] U.S. Cl. .................................... 366/303; 366/307; 241/46.11; 241/243
[58] Field of Search .................. 366/88, 90, 96, 168, 366/171, 172, 176, 302, 303, 305, 307, 321; 241/46.11, 46.17, 172, 236, 243

[56] References Cited

U.S. PATENT DOCUMENTS

| | | | |
|---|---|---|---|
| 282,131 | 7/1883 | Thompson | 241/46.11 X |
| 493,603 | 3/1893 | Sibley | 366/303 X |
| 1,977,955 | 10/1934 | Robinson | 366/303 X |
| 2,169,338 | 8/1939 | Ditto | 366/303 |
| 2,255,213 | 9/1941 | Good | 366/303 X |
| 2,734,728 | 2/1956 | Myers | 366/303 |
| 2,798,698 | 7/1957 | Dooley | 241/46.17 X |
| 2,965,362 | 12/1960 | Flottmann et al. | 366/171 X |
| 3,938,783 | 2/1976 | Porter | 366/307 X |
| 4,976,547 | 12/1990 | Hisanaga et al. | 366/307 X |

FOREIGN PATENT DOCUMENTS 48-54558 7/1973 Japan.

Primary Examiner—Charles E. Cooley
Attorney, Agent, or Firm—Lowe, Price, LeBlanc & Becker

[57] ABSTRACT

A mixer capable of mixing a resin material consisting of a plurality of liquids and of discharging the mixture. The mixer includes a plurality of agitating portions provided on a rotor shaft, and a plurality of partitioning members disposed in a mixing chamber with the rotor shaft accommodated therein, for respectively partitioning each space defined between adjacent ones of the agitating portions. A gap between the agitating portion and the partitioning member is set to be small, and the partitioning members are provided with small holes. The material which is fed toward a discharging end through the small holes is consecutively cut by the agitating portions, and the liquid resin material can be mixed at low rotational speed.

8 Claims, 6 Drawing Sheets

TWO LIQUID TYPE MIXER

BACKGROUND OF THE INVENTION

1. Field of the Invention

The present invention relates to a two-liquid type mixer for mixing two liquid materials to form a resin material, and for applying or injecting the resin material from the mixer.

2. Description of the Related Art

Silicon resins are known to be of a two-liquid type wherein liquids A and B are mixed in a mixer to form a mixed liquid which is discharged from a nozzle defining the forward end of a mixer which may have a hollow cylindrical shape.

FIGS. 8 and 9 are illustrations of conventional mixers. A mixer MX1 as depicted in FIG. 8 includes a rotor 3 connected to a driving source (not shown) and disposed rotatably in a casing 2 having a hollow cylindrical chamber and a nozzle 1 at a tip thereof. In this mixer MX1, the two liquids A and B are fed under pressure through channels 4A and 4B which are provided at an upper end of the mixer MX1. A screw for feeding the two liquids A and B under pressure may be provided above the rotor 3, as required. Since rotor 3 rotates in the chamber within the casing 2, the two liquids A and B are agitated appropriately for discharge through nozzle 1.

In the hollow cylindrical mixer MX2 depicted in FIG. 9, blade assemblies 3A of the rotor 3 are arranged at equal distances along the rotor and projections 6 projecting from an inner wall surface of the casing 2 are alternately disposed between adjacent ones of the blade assemblies 3A. These projections 6 prevent the mixed liquid from flowing in an unobstructed manner along the wall surface of the chamber 2.

With conventional mixers MX1 and MX2, however, the following drawbacks have been encountered.

First, with reference to mixer MX1, since a passage which allows the mixed liquid to flow therethrough is formed along the inner wall surface of casing 2, a partially unmixed liquid is discharged from the nozzle 1, irrespective of positioning of rotor 3. Accordingly, this mixer is difficult to use where sufficient mixing is required (e.g., mixing a resin with a foaming agent).

With reference to mixer MX2, although the above-described direct flow of the mixed liquid in an unobstructed manner is prevented slightly by means of the projections 6 provided on the inner wall surface of the casing 2, this structure merely prevents the direct flow of the mixed liquid in an unobstructed manner along the inner wall surface of the chamber 2. When seen in a plan view, a large gap is always present between the blade assembly 3A of the rotor 3 and the projection 6. Hence, mixer MX2 unavoidably discharges an incompletely mixed mixture.

If two liquids constituting a foaming silicone resin are mixed with either mixer MX1 or MX2 and the mixture is then allowed to foam, foaming becomes incomplete due to incomplete mixing, so that a continuous foam F1 of a mottled pattern is formed, as depicted in FIG. 10. In addition, since foamed particles gather and the surface becomes hardened, the product becomes defective, so that it is difficult to obtain a foam F2 having proper closed bubbles, such as the foam in FIG. 11.

Furthermore, since the above-described mixers MX1 and MX2 are arranged to perform the liquid agitating action based on the rotation of the rotor 3, the number of revolutions becomes large (e.g., 2400 rpm). Hence, there is a problem of high heat generation which accelerates curing in the case of a thermosetting resin. Excessively large cooling equipment is required to prevent both premature curing and early foaming in the case of a foaming resin.

These various problems tend to be promoted as the viscosity of the mixed liquid becomes high. This is attributable to the fact that as the viscosity becomes high, the mixed liquid rotates with the rotor, thereby making it impossible to effect sufficient mixing.

SUMMARY OF THE INVENTION

It is an object of the present invention to provide a mixer which is capable of sufficient mixing even if the viscosity is high, and of suppressing heat generation to a low level by reducing the number of revolutions of a rotor.

In accordance with the present invention, there is provided a mixer including a casing having a hollow cylindrical chamber therein, and a rotor disposed rotatably in the chamber so as to mix a material, fed from one direction, by the rotational motion of the rotor for discharge of the material in another direction. In the mixer of the present invention, a plurality of agitating portions are provided on the rotor shaft at predetermined intervals. A plurality of partitioning members are provided in the chamber for respectively partitioning each space defined between adjacent ones of the agitating portions. Each of the partitioning members is provided with the small holes for feeding the material agitated by the agitating portion in a preceding stage to the agitating portion in an ensuing stage. Consequently, the mixed liquid pushed out from the small holes is cut off by the next agitating portion, and after being subjected to agitation by that agitating portion, the mixed liquid is pushed out to the next small holes. Accordingly, the mixed liquid undergoes the repeated operation of cutting, agitation, and passage through the small holes, so that an incompletely mixed portion is prevented from passing in an unobstructed manner. In addition, only a very small gap is present between each agitating member and each partitioning member adjacent thereto, such that sufficient frictional mixing can be carried out in this gap to prevent unmixed portions from passing through the small holes. Uniform mixing can thus be attained.

In terms of the positional relationships between the sets of the small holes, if the positions of the small holes in each partitioning member are offset from the positions of the small holes in a partitioning member adjacent thereto, the possibility that the mixed liquid, which has passed through the small holes, is fed directly to the small holes in the next stage without being cut by the agitating member, can be reduced to a low level, irrespective of the arrangement of the agitating portions.

The shape of the agitating portion can be designed freely, and it is possible to use, for instance, a structure in which rod-shaped members having a square cross section are attached to the rotor shaft in a radial direction, e.g., in the form of a cross.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a detailed description of the embodiments of the present invention will now be given.

Figure 1:
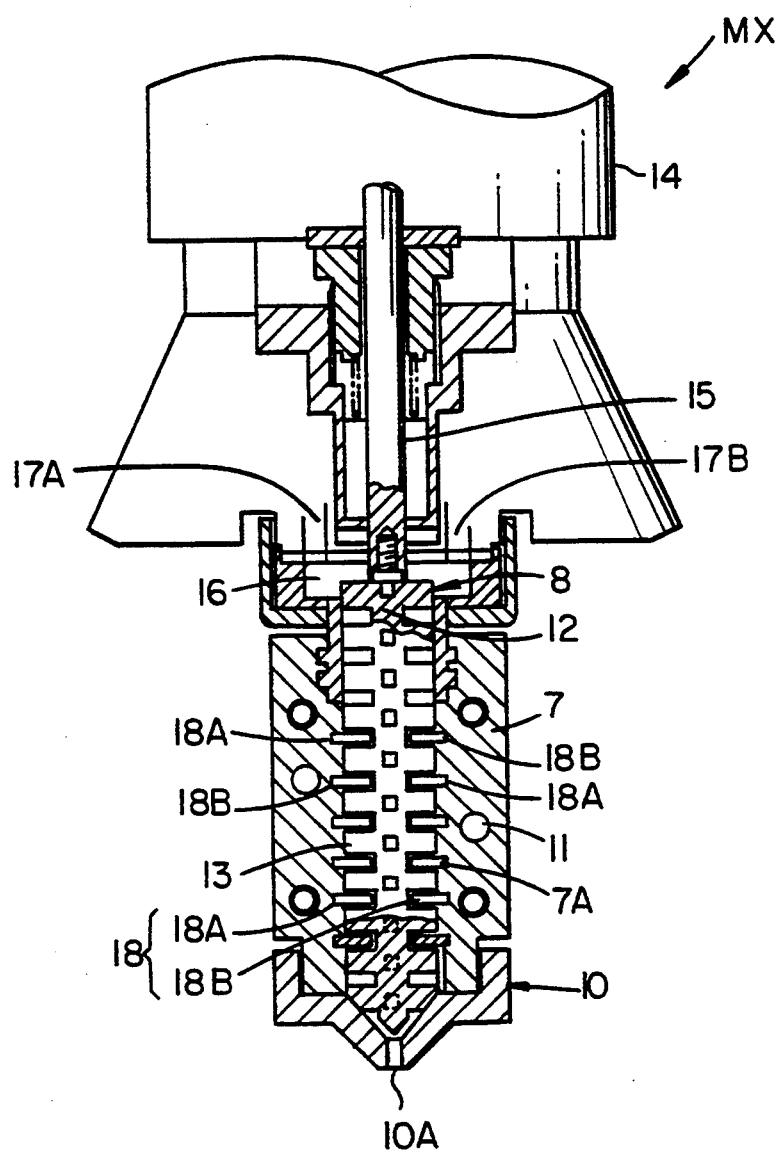
FIG. 1 is a partly sectional view of a mixer in accordance with a first embodiment of the present invention.

FIG. 1 is an illustration of a mixer MX in accordance with a first embodiment of the present invention, wherein a rotor 8 is disposed rotatably in a hollow cylindrical chamber of a casing 7. The outer configuration of casing 7 is formed in the shape of a substantially square prism, and is split into two parts which are coupled to each other by means of bolts (not shown). A cylindrical nozzle 10 having a nozzle hole 10A is joined to a tip of the casing 7, i.e., to a lower end thereof. Reference numeral 11 denotes a water cooling hole for allowing cooling water to flow through the casing.

Rotor 8 is comprised of an axially extending rotor shaft 12 and a plurality of blade assemblies 13 serving as agitating portions arranged at predetermined intervals of an equal pitch along the axial direction of the rotor shaft 12. Rotor shaft 12 is coupled for rotation by a rotating shaft 15 of an agitating motor 14. A material-feeding chamber 16 is formed above tile rotor 8, and channels 17A and 17B for feeding two liquids A and B, respectively, are formed in this chamber 16. In this embodiment, a principal agent of a silicone resin of an ordinary-temperature foaming type having a viscosity of 15,000 to 400,000 CP as well as a curing agent are used as the two liquids A and B, respectively.

Figure 2:
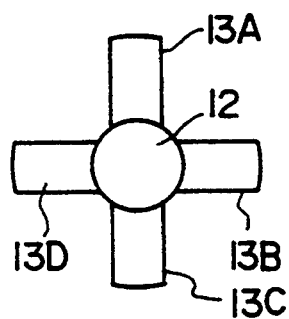
FIG. 2 is an enlarged plan view illustrating the configuration of an agitating portion of the mixer.

FIG. 2 shows an arrangement of one blade assembly 13, which comprises four blades 13A to 13D each having the shape of a square rod, and attached to the rotor shaft 12 in the form of a cross. The thickness of each blade assembly 13 is about 2 to 5 mm.

Annular grooves 7A are respectively cut in the inner peripheral surface of the casing 7 at intermediate positions between adjacent ones of the blade assemblies 13 along the axial direction. A disk 18 which is split into two parts and constitutes a partitioning member is fitted in each of grooves 7A.

Figure 3:
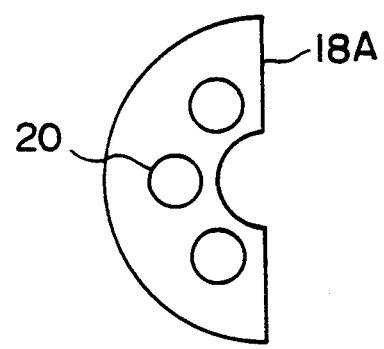
FIG. 3 is an enlarged plan view of a half portion of a partitioning member of a two-part structure.
Figure 4:
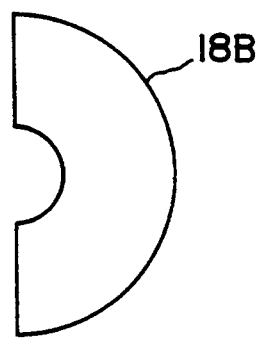
FIG. 4 is an enlarged plan view of the other half portion of the partitioning member in FIG. 3.

As depicted in FIGS. 3 and 4, disk 18 is formed with two kinds of semicircular plate pieces, i.e., a disk half 18A formed with small holes 20 and a disk half 18B formed without small holes. A total of six such disks are used in this embodiment. The number of the small holes 20 provided in each disk 18A is three in this embodiment.

Referring to FIG. 1, the disks 18 are arranged such that the disk halves 18A with the small holes 20 and the disk halves 18B without the small holes 20 are alternately arranged consecutively in one part of the split casing 7. In the other part of the split casing 7, the mating disk halves 18B or 18A are arranged respectively. Accordingly, in this embodiment, tile small holes 20 in the disks 18 arranged one above the other are in such a positional relationship as to be alternately offset from each other in the circumferential direction. This arrangement prevents the small holes 20 in the disks 18 from being aligned in straight lines, i.e., parallel with the rotor shaft 12, thereby eliminating the possibility of unobstructed flow of the material from one set of holes in one disk 18 to another. During assembly, the disk halves 18A and 18B are inserted alternately into the grooves 7A of one part of the split casing 7, and their mating disk halves 18B and 18A are inserted into the grooves 7A of the other part of the split casing 7. The two parts of the casing 7 are coupled to each other with bolts.

The thickness of each disk 18 is set to be about 2 to 5 mm, and the difference between the interval between the adjacent ones of the blade assemblies 13 along the axial direction of the casing 7 and the thickness of the disk 18 placed therebetween is set to be not more than about 1 mm (i.e., 0.5 mm on each of the upper and lower sides of the disk 18). The diameter of the small hole is set to be about 2 to 5 mm.

In the hollow cylindrical mixer MX having the above-described arrangement, if the motor 14 is rotated, and the two liquids A and B are fed under pressure through the channels 17A and 17B, the material (mixed liquid) is supplied via the material-feeding chamber 16 from above the rotor 8 toward the nozzle 10. The mixed liquid is first mixed roughly in an upper portion of tile chamber defined by a portion of the rotor 8 where the disks 18 are not disposed, and an incompletely mixed liquid is supplied onto a first disk 18, i.e., an uppermost disk 18 in FIG. 1. At this time, the blade assemblies 13 are rotating together with the rotor shaft 12.

In a case where a silicone resin of an ordinary-temperature foaming type in accordance with this embodiment is used, the number of revolutions N of the rotor 8 may be considerably small, and is generally set at 50 to 1000 rpm. However, if a material which may undergo heat generation is used, tile number of revolutions of the rotor 8 may naturally exceed the aforementioned range. Also, a different number of revolutions may be used depending on the viscosity and the feed rate of the material, and the dimensions and shapes of blades and disks. In this embodiment, the rotational speed of the rotor 8 is set at 70 rpm.

The mixed liquid which reaches the first disk 18 passes through the small holes 20 while being mixed, and is cut by the blade assembly 13 in the next stage. If the material-feeding rate is assumed to be L (mm/sec), an amount of cut, P (mm), is in the following relationship:

$$P = 60L/(4 \times N)$$

where the numerical value 4 represents the number of the blades constituting the blade assembly 13. Accordingly, if L=1 and N=70, it follows from the above relation that P is approximately 0.214 mm. Namely, if the amount of cut P exceeds the thickness of the blade assembly 13, there arises the possibility of the mixed liquid passing from the small holes 20 into the next small holes 20 without being cut by the blade assembly 13. Therefore, the relationship between the feed rate and the number of revolutions of the rotor is adjusted in such a manner that the amount of cut P becomes as small as possible. For this reason, where the feed rate (discharge rate) is large, it is possible to cope with such a case by making the number of revolutions N large. Also, it is possible to cope with such a case by increasing the diameter of the small hole 20 or the number of the small holes 20, or by increasing the number of the blade assemblies 13. However, if the number of revolutions of the rotor 8 is made large, the amount of heat generated also becomes large, so that an upper limit of the number of revolutions of the rotor 8 is preferably set at 1000 rpm or thereabouts.

Some portion of the mixed liquid which was cut by the blade assembly 13 passes through the gap (0.5 mm) between the blade assembly 13 and the disk 18, and some other portion passes while being mixed in spaces formed respectively between the adjacent blades of the blade assembly 13. Then, the mixed liquid is sequentially cut and agitated in the subsequent stages in the same procedure, and is fed toward the nozzle hole 10A.

If a worst case is assumed, it is conceivable that an incompletely mixed liquid is fed consecutively through the small holes 20 without being mixed by the blade assemblies 13. In this embodiment, however, since the mixed liquid which is fed through the six disks is cut six times, each into a dimension of 0.1 to 0.5 mm or thereabouts, the final mixed liquid becomes a finely cut liquid.

Figure 11:
FIG. 11 is an explanatory diagram illustrating a cross-sectional structure of a proper foam.

By virtue of the above-described operation, as the blade assembly 13 rotates, the mixed liquid fed to the rotor 8 is frictionally mixed in the gap between the blade assembly 13 and tile disk 18, is mixed in the respective spaces formed between the adjacent blades of the blade assembly 13, and is cut by the blade assembly 13 in cooperation with edges of the small holes 20. Since this operation is repeated, the mixed liquid which reaches the nozzle hole 10A becomes a uniformly mixed liquid. If the number of revolutions N of the rotor 8 and the feed rate L are optimized, and the mixed silicone resin of the ordinary-temperature foaming type is allowed to foam, it is possible to effect ideal forming, as shown in FIG. 11, as a result of thorough mixing. Hence, it is possible to continuously discharge the two-liquid material for which high agitation efficiency is required.

In addition, since sufficient agitation is obtained at low rotational speed, the temperature of the material does not rise, and there is no need to lower the viscosity by heating, the gel time and the rise time become prolonged, so that the mixer in accordance with this embodiment can be introduced easily as production equipment. Furthermore, since the rotational speed of the shaft is low, the life of the seal packing of the shaft can be prolonged.

In the above-described embodiment, although the blade assembly 13 is formed of a rod material of a square cross section, various modifications are possible as to shape (e.g., a round shape, star shape, and vane shape). However, since the blade assembly 13 performs the function of cutting the mixture being fed through the small holes in the disk 18 as described above, the blade assembly 13 should preferably be provided with an edge at its surface which is located close to the small holes 20.

In the above-described embodiment, the disk 18 has a two-part structure, tile small holes 20 are provided in only one disk half, and the positions of the small holes 20 in the disk 18 are offset from the positions of the small holes 20 in an adjacent disk 18. Depending on the feed rate of the mixed liquid, however, even if the small holes in the adjacent disks 18 are aligned with each other, there is no possibility of the mixed liquid flowing directly from one set of small holes into another without being cut. In such a case, the positions of the small holes 20 in the disks 18 can be set at the same positions in alignment with each other. In addition, although the small holes 20 in the above example are circular in shape, the shape of the small holes 20 may be elliptical, or in the form of slits, or the like. Moreover, the number of the small holes 20 provided may be increased or decreased, as required.

Figure 5:
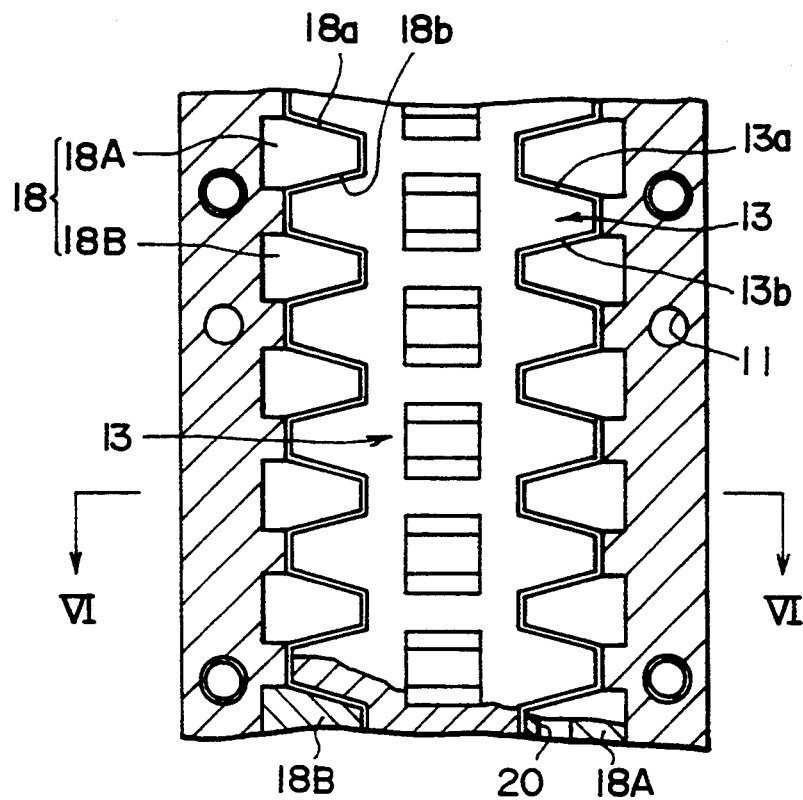
FIG. 5 is a partly sectional view of an essential portion in accordance with a second embodiment of the present invention.
Figure 6:
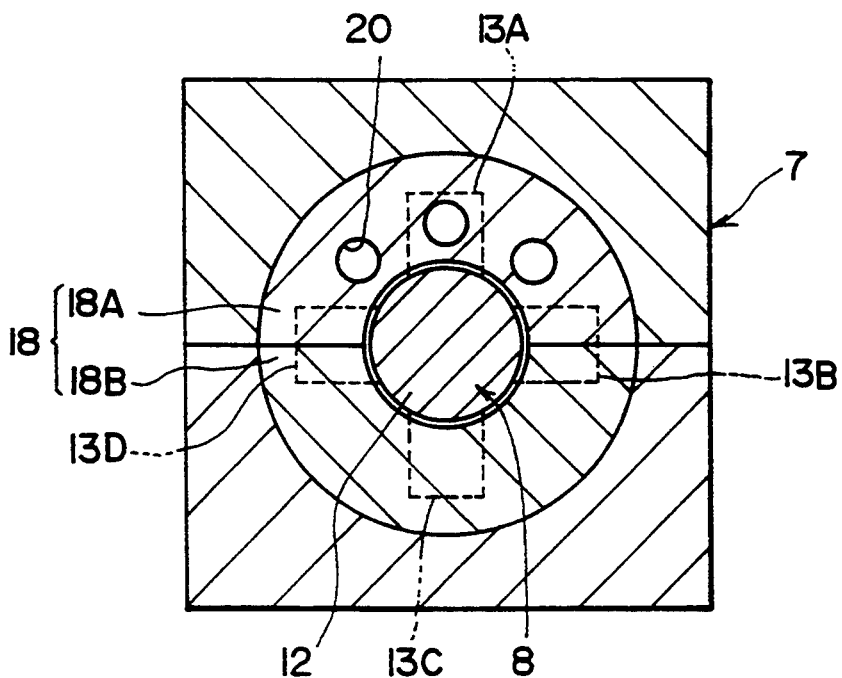
FIG. 6 is a cross-sectional view taken in the direction of arrows along line VI—VI of FIG. 5.
Figure 7:
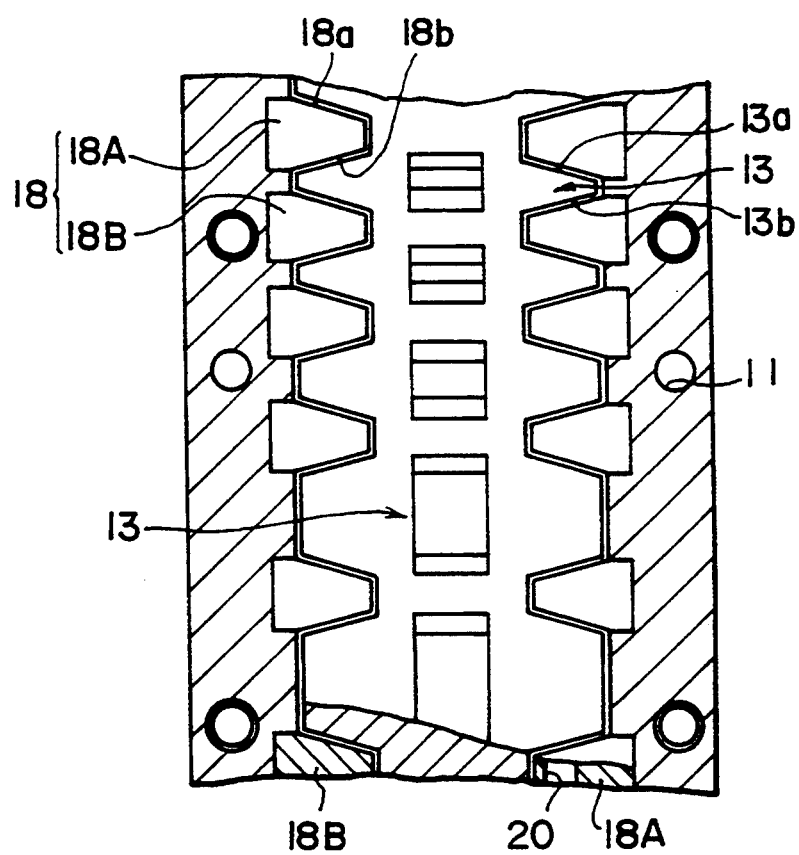
FIG. 7 is a partly sectional view of an essential portion in accordance with a third embodiment of the present invention.
Figure 8:
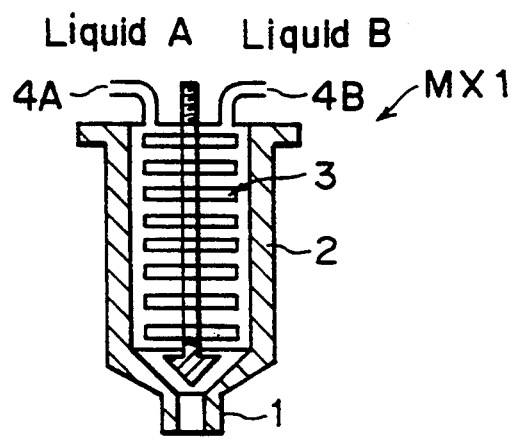
FIG. 8 is a cross-sectional view of an example of a conventional mixer.
Figure 9:
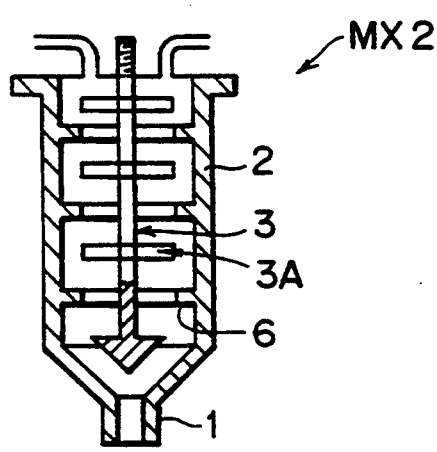
FIG. 9 is a cross-sectional view of another example of a conventional mixer.
Figure 10:
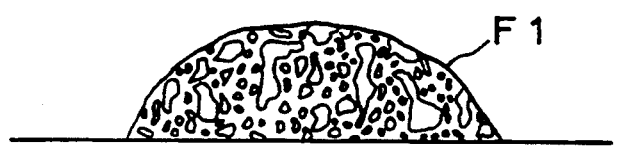
FIG. 10 is an explanatory diagram illustrating a cross-sectional structure of a foam obtained by a conventional mixer.

Referring to FIGS. 5 to 7, a description will now be given of second and third embodiments of the present invention. It should be noted that in the description of the respective embodiments, component parts that are identical or equivalent to those of the first embodiment will be denoted by the same reference numerals, and description thereof will be omitted or simplified.

FIGS. 5 and 6 depict the second embodiment. This second embodiment differs from the first embodiment in the shape of blade assembly 13 serving as the above-described agitating portion and in the shape of the disk 18 constituting the partitioning member.

Namely, as depicted in FIG. 5, in the blade assembly 13, upper and lower surfaces of the blades 13A to 13D, which are formed by square rods and constitute the blade assembly 13, are formed as inclined surfaces 13a and 13b such that the thickness of each blade 13A to 13D is tapered toward the inner wall of the casing 7. On the other hand, the disk halves 18A and 18B constituting the partitioning member 18 are also configured with inclined surfaces 18a and 18b corresponding to the inclined surfaces 13a and 13b.

The other arrangements are substantially similar to those of the first embodiment.

Accordingly, in accordance with this second embodiment, it is possible to attain the function of increasing the fluidity of the mixed liquid by means of the inclined surfaces 13a, 13b, 18a, and 18b. Thus, in addition to the advantages of the first embodiment, it is possible to obtain the advantage that the mixer in accordance with the present invention can be advantageously used particularly in mixing a high-viscosity resin material.

FIG. 7 is an illustration of a third embodiment wherein the basic shapes of the blade assembly 13 and the disk 18 are substantially identical to those of the second embodiment; however this third embodiment differs from the second embodiment in that the intervals between adjacent ones of the blade assemblies 13 and the intervals between adjacent ones of the disks 18, i.e., the pitches, are set to become gradually larger toward the discharge end.

In this third embodiment, in an initial state of material feeding, the above-described frictional mixing and cutting are effected finely, but on tile material-discharging side, relatively smooth feeding of the material is allowed.

Hence, this third embodiment offers an additional advantage in that residual stress which may occur due to mixing can be effectively avoided. By adopting this arrangement, as required, in correspondence with the resin material used, it is possible to expand the versatility of the mixer, Although, not shown, the form in which the pitches are varied, as shown in FIG. 7, may be applied to the first embodiment as well.

As described above, the present invention makes it possible to mix the material uniformly macroscopically and microscopically by virtue of the material cutting and agitating action in the agitating portions and by virtue of the frictional mixing action between the agitating portion and the partitioning member. In addition, since safe mixing with a low level of heat generation can be effected efficiently, the present invention can be used in the mixing and agitation of materials which should not desirably undergo heat generation. Thus, it is possible to provide a mixer capable of demonstrating an unprecedented advantage in that the present invention is particularly useful in the mixing of high-viscosity materials, which has conventionally been difficult, while maintaining higher agitation efficiency than conventional mixers even in the case of low-viscosity materials.

What is claimed is:

1. A mixer, comprising a casing having a hollow cylindrical chamber therein, and a rotor disposed rotatably in the chamber so as to mix a material, fed from one direction, by the rotational motion of the rotor, for discharge of the material after mixing, said mixer further including:

a plurality of agitating portions disposed on a shaft of said rotor at predetermined intervals;

a plurality of partitioning members disposed in said chamber for respectively partitioning each space defined between adjacent ones of said agitating portions, in such a manner as to provide a small gap between each of said agitating portions and each of said partitioning members, wherein each of said partitioning members is provided with an appropriate number of small holes for feeding the material agitated by one of said agitating portions in a preceding stage to another of said agitating portions in an ensuing stage, and each of said agitating portions is provided with a material cutting portion for cutting the material fed out from the small holes consecutively into small dimensions, wherein said plurality of agitating portions are arranged at said intervals whose pitches become gradually larger toward a material discharging end of said casing.

2. A mixer, comprising a casing having a hollow cylindrical chamber therein, and a rotor disposed rotatably in the chamber so as to mix a material, fed from one direction, by the rotational motion of the rotor, for discharge of the material after mixing, said mixer further including:

a plurality of agitating portions disposed on a shaft of said rotor at predetermined intervals;

a plurality of partitioning members disposed in said chamber for respectively partitioning each space defined between adjacent ones of said agitating portions, in such a manner as to provide a small gap between each of said agitating portions and each of said partitioning members, wherein each of said partitioning members is provided with an appropriate number of small holes for feeding the material agitated by one of said agitating portions in a preceding stage to another of said agitating portions in an ensuing stage, and each of said agitating portions is provided with a material cutting portion for cutting the material fed out from the small holes consecutively into small dimensions, wherein each of said partitioning members comprises a disk formed by combining two kinds of semicircular plate pieces, one of said semicircular plate pieces being provided with the small holes, and the other one of said semicircular plate pieces being provided without small holes.

3. A mixer according to claim 2, wherein said disks are supported in an inner wall portion of said casing.

4. A mixer according to claim 2, wherein the thickness of each of said disks is selected to be within a range of 2 to 5 mm.

5. A mixer according to claim 2, wherein a gap between each of said disks and said adjacent ones of said agitating portions is set to be 0.5 mm or less.

6. A mixer according to claim 2, wherein each of said disks has inclined upper and lower surfaces such that the thickness of each of said disks is tapered toward said rotor shaft.

7. A mixer according to claim 2, wherein said disks are arranged at predetermined intervals of an equal pitch along an axial direction of said rotor shaft.

8. A mixer according to claim 2, wherein said disks are arranged at intervals whose pitches become gradually larger toward a material discharging end of said casing.

* * * * *